(12) United States Patent
Ikeda (10) Patent No.: US 6,640,858 B2
(45) Date of Patent: Nov. 4, 2003

(54) TIRE HAVING TREAD GROOVES HAVING RIGHT-HAND GROOVE WALL AND LEFT-HAND GROOVE WALL

(75) Inventor: Akio Ikeda, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 74 days.

(21) Appl. No.: 09/729,418

(22) Filed: Dec. 5, 2000

(65) Prior Publication Data

US 2001/0035245 A1 Nov. 1, 2001

(30) Foreign Application Priority Data

Dec. 7, 1999 (JP) ............ 11-348063
Dec. 7, 1999 (JP) ............ 11-348065

(51) Int. Cl.⁷ .......... B60C 11/12; B60C 11/13; B60C 101/00; B60C 103/04
(52) U.S. Cl. .......... 152/209.15; 152/209.18; 152/209.24; 152/209.27; 152/903; 152/DIG. 3
(58) Field of Search .......... 152/209.15, 209.18, 152/209.27, 902, 903, DIG. 3, 209.24

(56) References Cited

U.S. PATENT DOCUMENTS

| | | | |
|---|---|---|---|
| 2,670,777 A | * | 3/1954 | Wallace |
| 5,501,258 A | * | 3/1996 | Sulkowski |
| 5,665,184 A | | 9/1997 | Fukumoto |
| 5,766,383 A | * | 6/1998 | Hasegawa et al. |
| D405,401 S | * | 2/1999 | Ikeda |
| 5,967,210 A | | 10/1999 | Himuro |
| 6,021,830 A | * | 2/2000 | Iwamura |
| D423,424 S | * | 4/2000 | Ikeda |
| 6,340,040 B1 | * | 1/2002 | Ikeda |
| 6,386,253 B1 | * | 5/2002 | Marriott |

FOREIGN PATENT DOCUMENTS

| | | | |
|---|---|---|---|
| EP | 0370747 | | 5/1990 |
| EP | 602989 | * | 6/1994 |
| EP | 816130 | * | 1/1998 |
| EP | 0904960 | | 3/1999 |
| EP | 0997323 | | 5/2000 |
| GB | 1549347 | * | 8/1979 |
| JP | 4-197806 | * | 7/1992 |
| JP | 5-178026 | * | 7/1993 |
| JP | 8-332810 | * | 12/1996 |

* cited by examiner

*Primary Examiner*—Steven D. Maki
(74) *Attorney, Agent, or Firm*—Birch, Stewart, Kolasch & Birch, LLP (57) ABSTRACT

A tire comprises a tread portion in which a mold parting line by a single-split mold runs on or near the tire equator. In a central part of the tread portion in which tread grooves are provided, the groove edges which are stroked by tire mold's protrusions for making the tread grooves when the mold is opened are provided with a chamfer backed by a recess and/or the groove walls extending from such groove edges are provided with a variable inclination, whereby demolding defects can be reduced.

14 Claims, 6 Drawing Sheets

TIRE HAVING TREAD GROOVES HAVING RIGHT-HAND GROOVE WALL AND LEFT-HAND GROOVE WALL

The present invention relates to a tire more particularly to a tread groove structure being capable of reducing demolding defects caused by a single-split mold.

In comparison with a segment mold which comprises circumferentially divided, radially movable sectors, a single-split mold or two-piece mold having a split face on or near the tire equator is knows as low cost because the mold itself and incidental equipment, controller and the like are simple.

When such a single-split mold is opened to take out the vulcanized tire therefrom, as the two mold pieces are moved outwards in the tire axial direction, grooved parts in the tread portion of the tire are liable to be damaged by protrusions which are provided on the inside of the mold in order to make tread grooves. Such demolding defects are more liable to occur as the inclination angle of the groove becomes smaller with respect to the tire circumferential direction and in the tread central portion than the tread shoulder portion.

On the other hand, ordinary pneumatic tires are provided in the tread portion with a circumferential groove and/or a less-inclined oblique groove. Accordingly, it is difficult to manufacture such tires using a single-split mold although it can reduce the tire production cost.

It is therefore, an object of the present invention to provide a pneumatic tire which can be made without demolding defects using a single-split mold even if a circumferential groove and/or less-inclined oblique grooves are disposed in the tread central portion.

According to the present invention, a tire comprises
  a tread portion in which a mold parting line by a single-split mold runs on or near the tire equator defining a right-hand part of the tread portion on one side of the mold parting line and a left-hand part on the other side,
  the tread portion provided in at least a central part with tread grooves each having a right-hand groove wall and a left-hand groove wall, wherein
  in the right-hand part, the right-hand groove walls are at least partially provided with an inclined part extending from the tread face towards the groove bottom while inclining to the left, and the left-hand groove walls are inclined less than the inclined part of the respective opposite right-hand groove walls,
  in the left-hand part, the left-hand groove walls are provided with an inclined part extending from the tread face towards the groove bottom while inclining to the right, and the right-hand groove walls are inclined less than the inclined part of the respective opposite left-hand groove walls, and
  the inclined parts are
a first inclined part extending from the tread face to the vicinity of the groove bottom, while inclining at an first inclination angle of from 15 to 45 degrees, and/or
a second inclined part inclined at a second inclination angle of from 30 to 60 degrees and having a width of from 0.3 to 2 mm when measured in parallel to the tread face and accompanied by a recess which is narrower and shallower than the tread groove and extends along the second inclined part.

An embodiment of the present invention will now be described in detail in conjunction with the accompanying drawings.

In the drawings, a pneumatic tire 1 according to the present invention comprises a tread portion 2, a pair of sidewall portions, a pair of bead portions each with a bead core therein (not shown) and a carcass (not shown) extending between the bead portions. The tread portion 2 is provided between the tread edges Te with tread grooves G forming a tread pattern. The tread grooves G include at least one circumferential groove and a plurality of oblique grooves.

Figure 1:
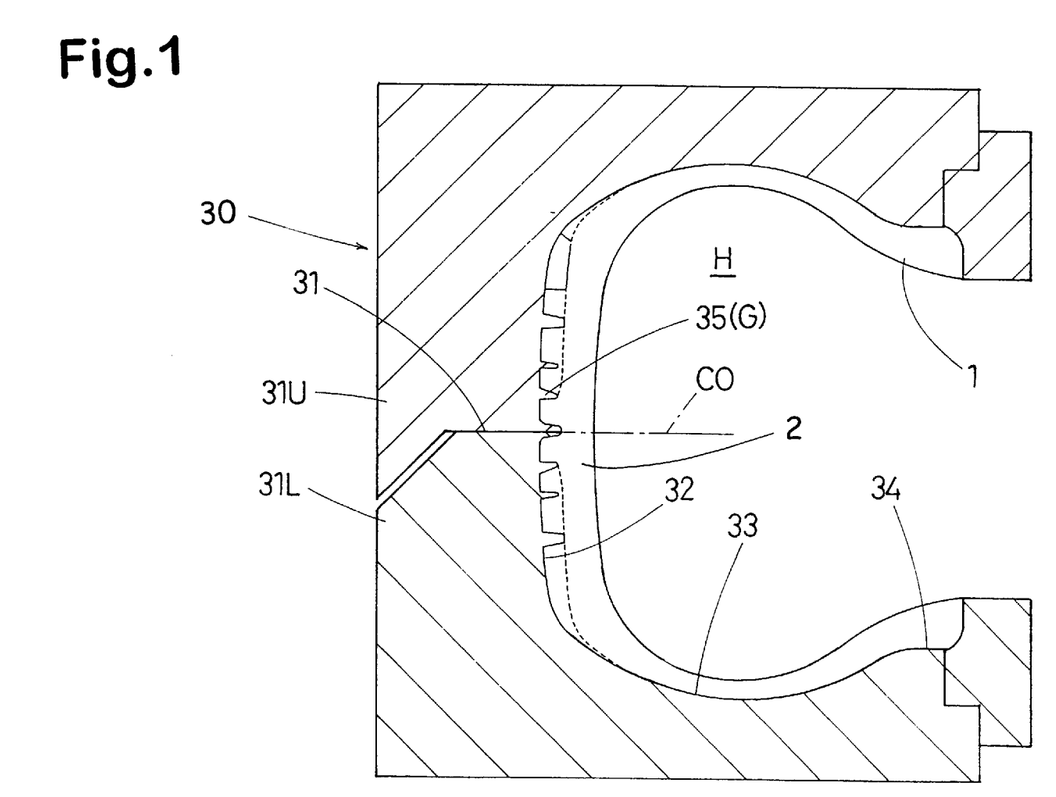
FIG. 1 is a schematic cross sectional view of a single-split mold and a pneumatic tire according to the present invention.

According to the present invention, the pneumatic tire 1 is formed by a single-split mold 30 comprising a first piece 31U and a second piece 31L. As a result, a mold parting line (31) runs on or near the tire equator CO. When opening the mold 30, the first piece 31U and second piece 31L move towards both sides of the tire in parallel with the tire axial direction. Incidentally, the inner face of the mold 30 is profiled and comprises a tread shaping face 32 with protrusions 35 for making the tread grooves G, a pair of sidewall shaping faces 33, and a pair of bead shaping faces 34. In this example, the first piece 31U and second piece 31L are mounted on a ram and a bed of a press, respectively. Thus, the mold 30 can be opened and closed by up and down movements of the ram. The split face 31 between the two pieces 31U and 31L is positioned on the tire equator CO on the tread shaping face 32.

Figure 2:
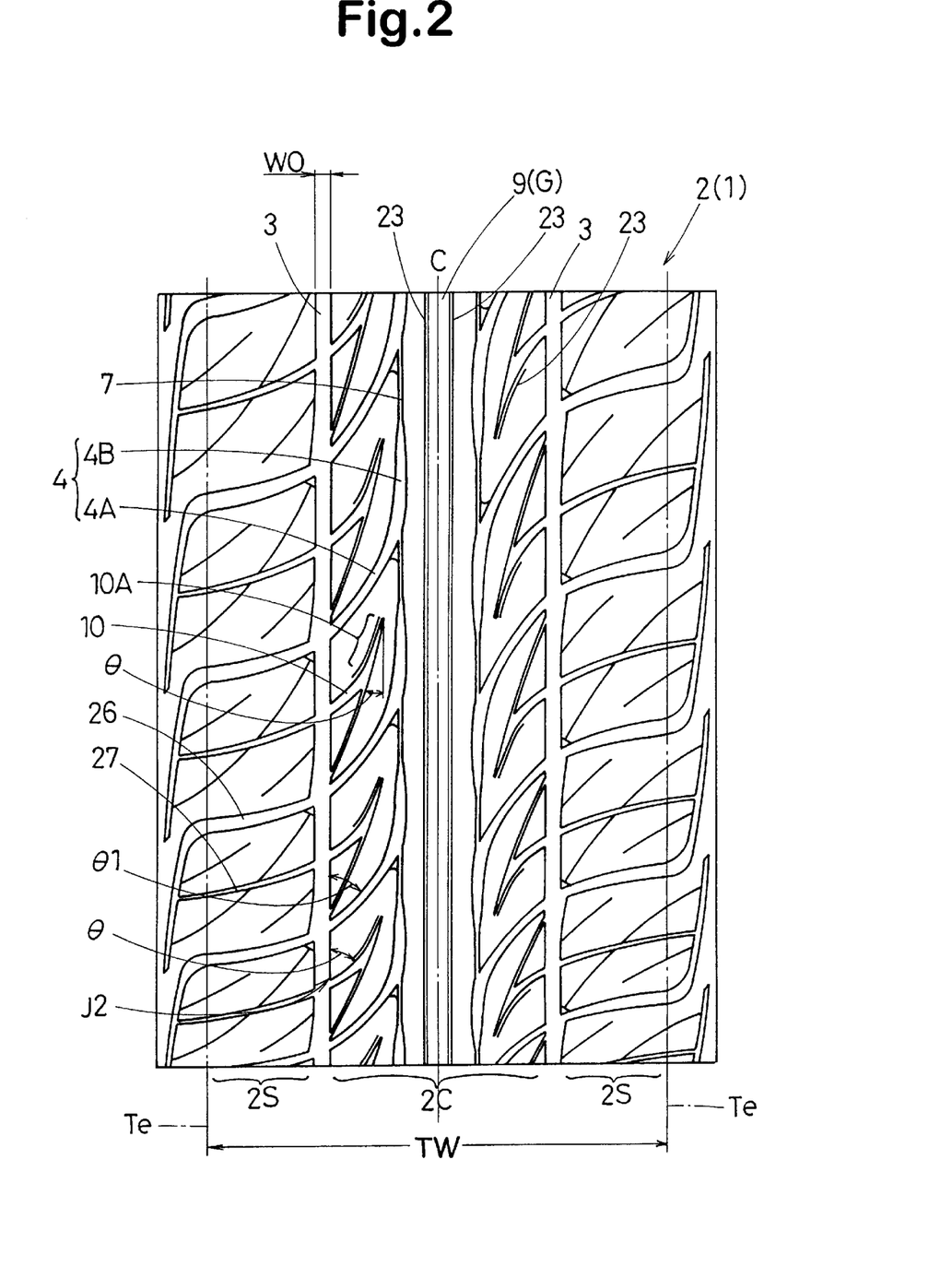
FIG. 2 is a plan view of the tire showing an example of the tread groove arrangement.

FIG. 2 shows an example of the tread groove arrangement or the tread pattern, which is a bi-directional tread pattern being substantially rotational symmetric. But, it is also possible to provide a uni-directional tread pattern being substantially symmetric about the tire equator C. Usually, pitch variations are employed in arranging tread grooves such as oblique grooves, and a circumferential phase shift is made between a right half tread pattern and a left half tread pattern. Accordingly, a strictly symmetrical pattern is rare. Thus the expression "substantially symmetrical" is meant to includes such fluctuations.

Here, the above-mentioned tread edges Te mean the axial outermost edges of the ground contacting region under such a condition that the tire is mounted on a standard rim and inflated to a standard pressure, and then loaded with a standard load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. In case of passenger car tires, however, 180 kPa is used as the standard pressure. The standard load is the "maximum load capacity" in JATMA, the "Load Capacity" in ETRTO, the maximum value given in the above-mentioned table in TRA or the like.

The under-mentioned tread central portion 2C is defined as a portion centered on the tire equator C and having a 50% width of the tread width TW. The remaining 25% width portion on each side of the central portion 2C is referred as shoulder portion 2S. The tread width TW is the axial width between the tread edges Te.

Because the demolding defects are liable to occur in the tread central portion 2C than the shoulder portions 2S, there are provided demolding-defect preventing means mainly on tread grooves which are partially or wholly existing in the tread central portion 2C. However, if groove inclination with respect to the tire circumferential direction is more than 45 degrees, such means are not necessary.

The demolding-defect preventing means are provided as follows.

In the example shown in FIG. 1, a central circumferential groove 9 and an axially outer circumferential groove 3 on each side thereof are provided. Further, as to the oblique grooves, main oblique grooves 4 and secondary oblique grooves 10, each extending axially inwardly from one of the outer circumferential grooves 3, are disposed.

The central circumferential groove 9 is a substantially straight groove extending continuously along the tire equator C.

The axially outer circumferential grooves 3 are also a substantially straight groove extending continuously around the tire in parallel with the tire equator C. Each of the outer circumferential groove 3 is disposed in a middle region which region is defined as extending towards each side from the border between the central portion 2C and shoulder portion 2S by 5% of the tread width TW. In this example, the circumferential groove 3 extends along the border line. In case of passenger car tires, the width WO of the outer circumferential groove 3 is at least 2.5% preferably more than 3.0% of the tread width TW.

The demolding-defect preventing means are therefore, provided on the central circumferential groove 9 but not provided on the outer circumferential grooves 3.

The demolding-defect preventing means in this case is a chamfer portion 21B accompanied by a recess 23. The chamfer portion 21B is provided on the groove edge which is stroked by the protrusions 35 of the mold 30 when the mold is opened. The recess 23 is formed near and axially outside the chamfer portion 21B.

Figure 3:
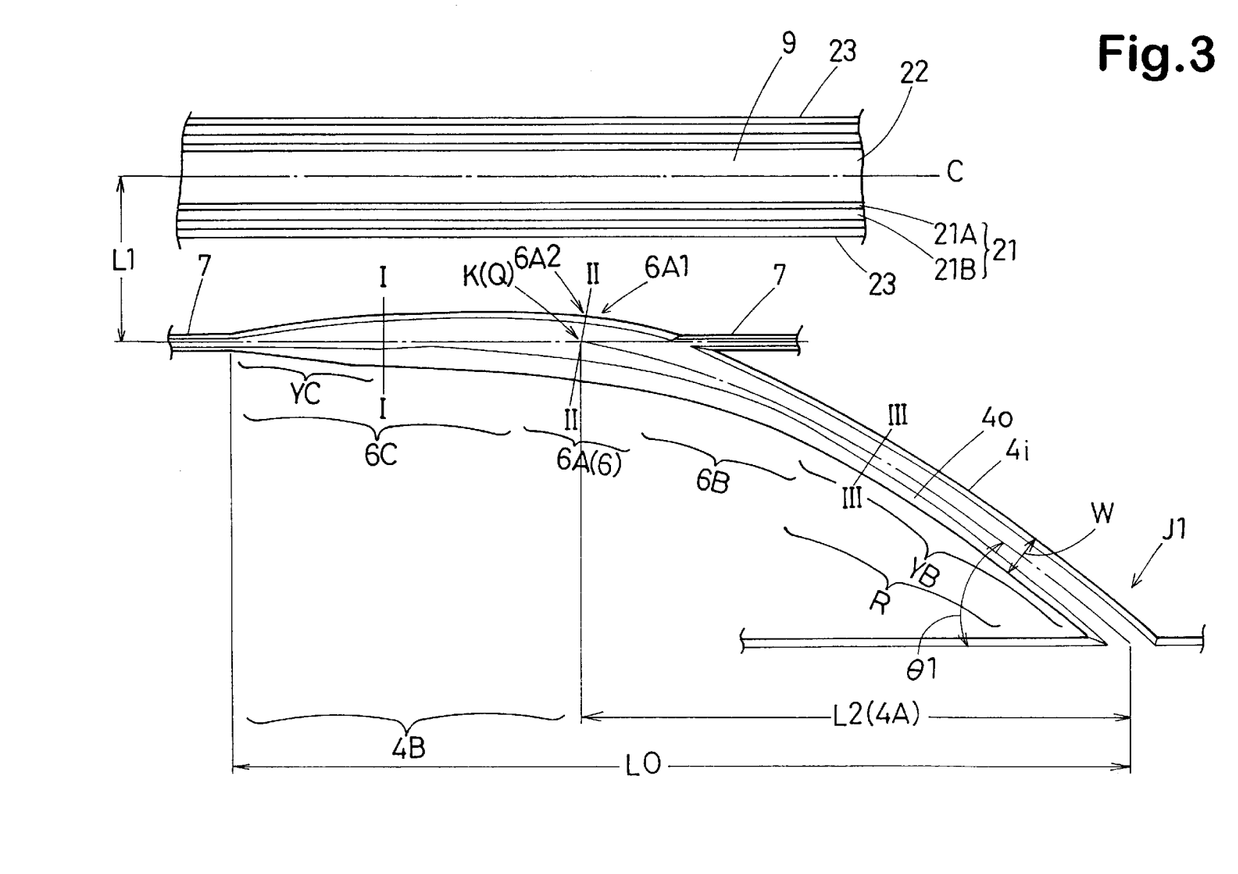
FIG. 3 is an enlarged plan view showing the central circumferential groove and a main oblique groove thereof.
Figure 4:
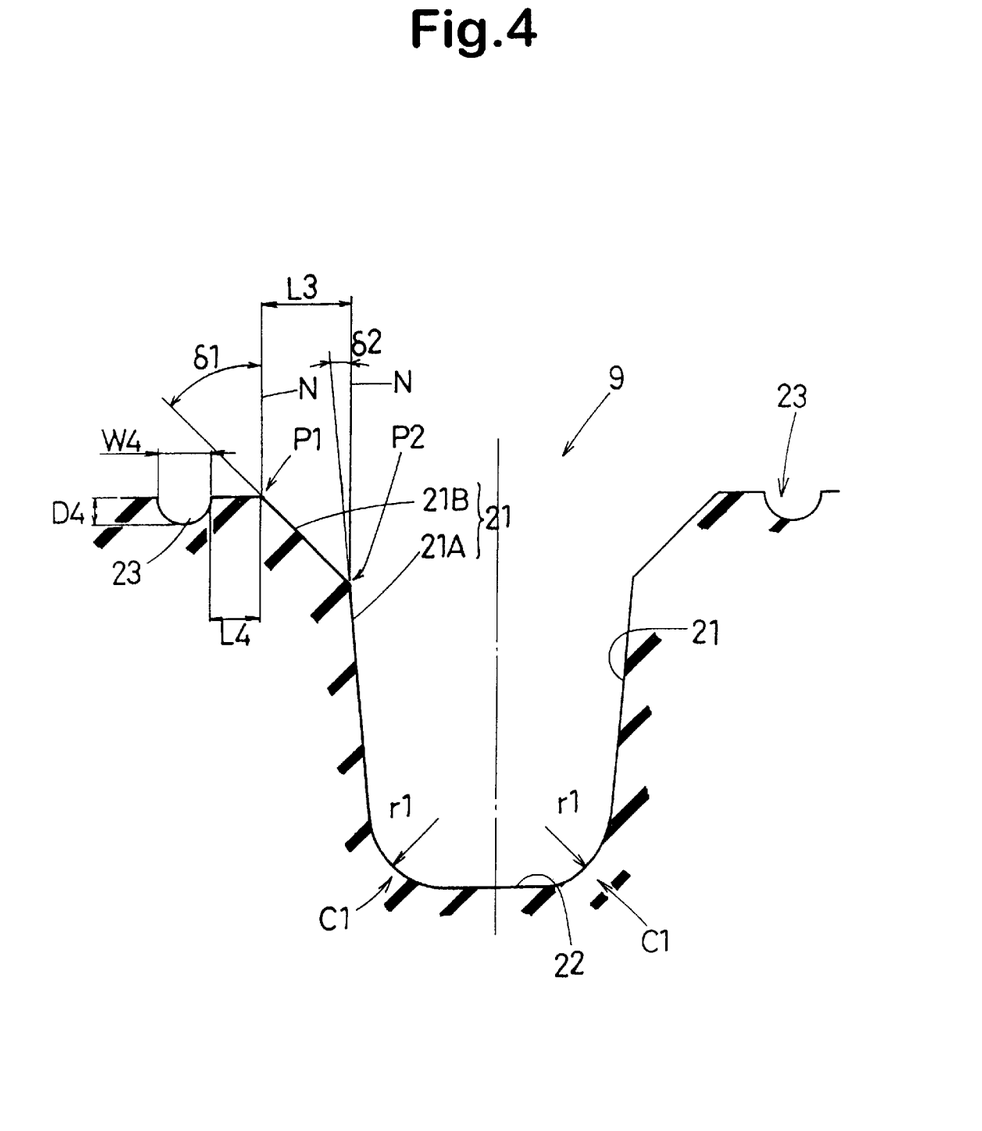
FIG. 4 is a cross sectional view of the central circumferential groove.

In case of the central circumferential groove 9, as the mold parting line runs in the groove bottom, the chamfer portion 21B and recess 23 are provided on each edge as shown in FIGS. 3 and 4. Therefore, each of the groove walls 21 comprises a main portion 21A extending radially outwardly from the groove bottom 22 and the chamfer portion 21B extending radially outwardly from the radially outer end of the main portion 21A to the tread face 2 while both inclining axially outwards. In a cross section normal to the groove center line, the inclination of the groove wall 21 with respect to the normal direction to the tread face is as follows: the inclination angle θ2 of the main portion 21A is preferably set in a range of from 2 to 8 degrees; the inclination angle θ1 of the chamfer portion 21B is set in a range of from 30 to 60 degrees. The axial width L3 between the outer and inner ends P1 and P2 of the chamfer portion 21B is set in a range of from 0.3 to 2.0 mm. Further, the corner C1 between the main portion 21A and groove bottom 22 is rounded by a radius r1 of from 0.5 to 2.0 mm.

The recess 23 is formed on the tread face along the chamfer portion 21B. The recess 23 has a sectional shape having a curved base such as a semicircle, semioval and the like. In the cross section normal to the groove center line, the width W4 of the recess 23 is in a range of from 0.3 to 3.0 mm when measured in parallel with the tread face, and the depth D4 thereof is in a range of from 0.3 to 2.0 mm when measured from the tread face to the deepest point. The distance L4 from the outer end P1 to the recess 23 is set in a range of from 0.5 to 2.0 mm.

As to the outer circumferential groove 3 in this example, as the axially outer groove wall is outside the tread central portion 2C, the chamfer portion 21B and recess 23 are not formed. Each of the axially outer and inner groove walls is composed of a main portion 21A extending from the groove bottom 22 to the tread face 2 while inclining outwards at the above-mentioned inclination angle θ2. If need be, however, it is possible to provide the chamfer portion 21B and recess 23 in the same manner as the central groove 9.

Owing to the chamfer portion 21B backed by the recess 23, demolding defects can be effectively controlled although the size of the chamfer portion 21B and recess 23 and the distance therebetween are considerably small.

As to the above-mentioned main oblique grooves 4, each extends axially inwardly from one of the outer circumferential grooves 3, but, as shown in FIG. 2, does not reach to the central circumferential groove 9 to form a circumferentially continuous rib on each side of the central circumferential groove 9.

Each main oblique groove 4 comprises an axially inner circumferential portion 4B and an axially outer inclined portion 4A. The inclined portion 4A extends axially inwardly from the outer circumferential groove 3. The inclination angle θ1 thereof with respect to the tire circumferential direction is set in a range from 30 to 60 degrees, preferably 40 to 50 degrees at the junction J1 with the circumferential groove 3. From the junction J1 towards the axially inside, the inclination angle θ1 gradually decreases to substantially zero degrees so that the inclined portion 4A merges into the circumferential portion 4B. The circumferential portion 4B extends substantially parallel to the tire circumferential direction. The distance L1 from the tire equator C to the center line of the circumferential portion 4B is set in a range of not more than 15% of the tread width TW. The circumferential length L2 of the inclined portion 4A is set in a range of not less than 50% of the total circumferential length L0 of the main oblique grooves 4.

Figure 5A:
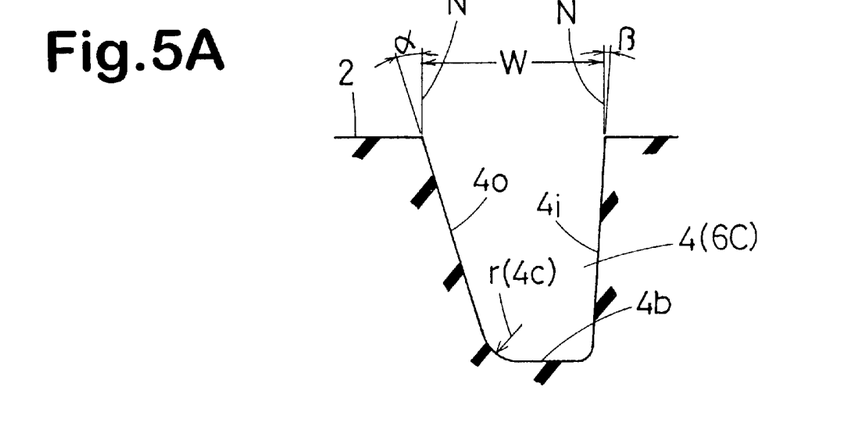
FIGS. 5A, 5B and 5C are cross sectional views of the main oblique groove taken along lines I—I, II—II and III—III in FIG. 3, respectively.
Figure 5B:
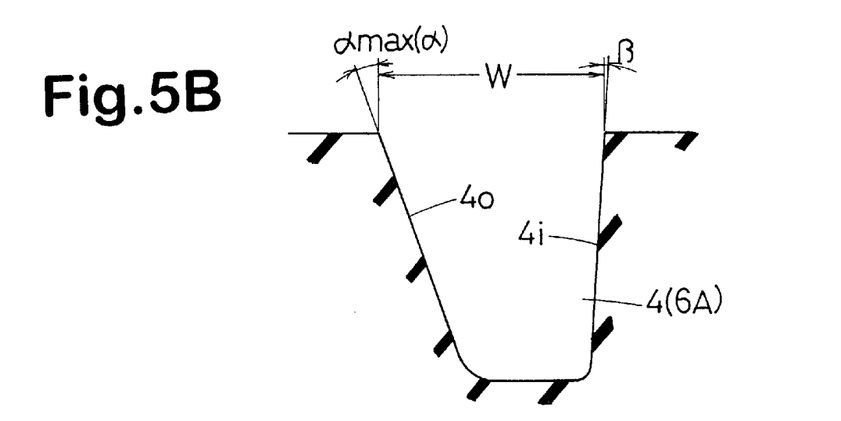
Figure 5C:
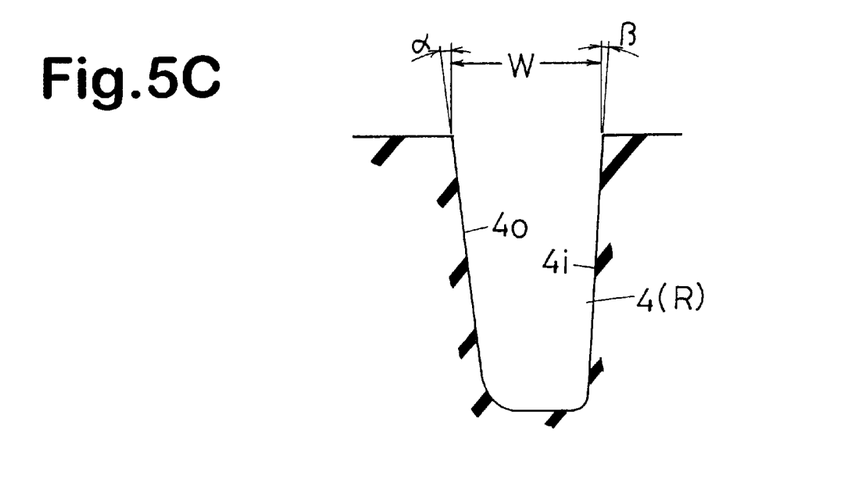

As the main oblique grooves 4 each have a certain circumferential extent and a certain depth, demolding-defect preventing means is provided. In this case, the means is a variable inclination α of the axially outer groove wall 4o. FIGS. 5A, 5B and 45C each show a cross section normal to the groove center line. The inclination a becomes maximum (αmax) in the vicinity of the groove bent point K or connect point K of the inclined portion 4A and circumferential portion 4B. To be exact the connect point K may be defined as the meeting of the center line of the inclined portion 4A and the center line of the circumferential portion 4B.

The maximum inclination αmax is set in the range of from 15 to 45 degrees, preferably 15 to 25 degrees.

This maximum inclination αmax continues for a certain length and then in subsequent portions YB and YC (hereinafter the "angularly changing portions YB and YC"), the inclination angle α gradually decreases towards the axially outer and inner ends of the groove.

Further, the corner 4c between the axially outer groove wall 40 and groove bottom 4b is rounded by a radius of curvature (r) of not less than 1.0 mm. Usually, the radius (r) is set to be not more than 3.0 mm.

On the other hand, the axially inner groove wall 4i has an inclination angle β in a range of from 0 to 6 degrees and, unlike the axially outer groove wall 40, it is substantially constant along the length of the oblique groove 4.

As a result of the above-mentioned variable inclination, the top width W of the main oblique groove 4 becomes increased towards the point K from each of the axially inner and outer ends.

In this example further, the bottom width is increased in a part 6A which extends from the contact point K towards the inclined portion 4A and circumferential portion 4B. Accordingly, the top width W is maximum in the part 6A, and the top width W gradually decreases in the subsequent transitional parts 6B and 6C. The axially inner transitional part 6C extends to the end of the circumferential portion 4B. The axially outer transitional part 6B extends to a position before the outer circumferential groove 3, and from this position a constant width part R extends to the junction J1.

It is preferable that the transitional parts 6B and 6C entirely overlap with the angularly changing portions YB and YC, respectively.

The maximum top width at the point K is preferably set in a range of from 60 to 100% of the top width WO of the circumferential groove 3. The top width W at the junction J1 is preferably set in a range of from 25 to 80% usually 40 to 60% of the top width WO.

Figure 6:
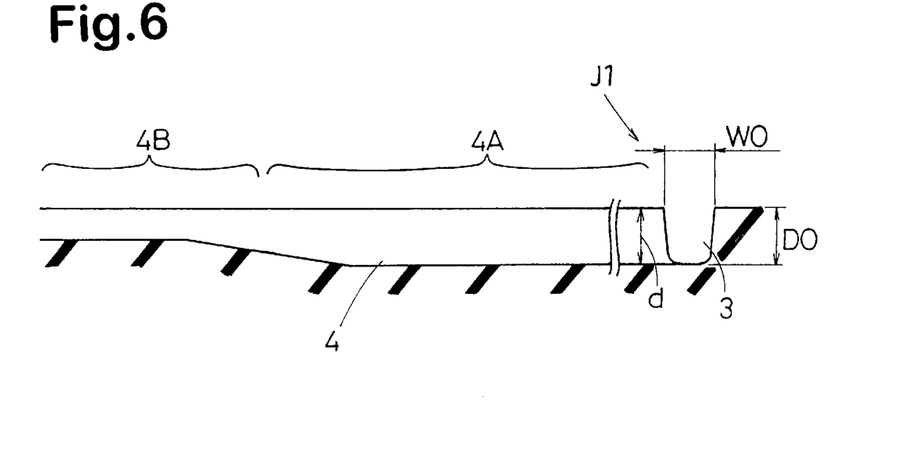
FIG. 6 is a sectional view taken along the center line of the main oblique groove.

The depth (d) of the main oblique groove 4 may be constant, but as shown in FIG. 6, it is preferable to gradually decreases the depth (d) from the circumferential groove 3 towards the axially inside. The depth at the junction J1 is substantially equal to the depth DO of the circumferential groove 3. In the circumferential portion 4B, the depth is set in a range of not more than 80% of the depth DO. In the example shown in FIG. 6, each of the inclined portion 4A and circumferential portion 4B has a constant depth part and a variable depth part.

In this example, further, the circumferentially adjacent circumferential portions 4B are connected with each other by connecting grooves 7. The connecting grooves 7 are narrower and shallower than these portions and have a width of from 0.5 to 3 mm and a depth of from 2 to 5 mm. Therefore, the circumferential portions 4B and these narrow connecting grooves 7 form a groove which extends continuously in the tire circumferential direction while repeatedly changing the width and depth. Although the narrow connecting grooves 7 extends in parallel with the tire equator, as the width and depth are limited as above, demolding defects on the narrow connecting grooves 7 can be controlled. Therefore, it can be said that such limitations are demolding-defect preventing means.

The above-mentioned secondary oblique groove 10 extends axially inwards from the outer circumferential groove 3 in substantially parallel with the inclined portion 4A and terminates before the circumferential portion 4B. The secondary oblique groove 10 has, at the junction J2 with the circumferential groove 3, an inclination angle θ of from 30 to 60 degrees, preferably 40 to 50 degrees with respect to the circumferential direction. The inclination angle θ gradually decreases from the junction J2 towards the axially inside while describing substantially a part of a circle.

In this example, an axially inner part 10A of the secondary oblique groove 10 has an inclination angle θ of less than 45 degrees with respect to the circumferential direction. As the secondary oblique groove 10 is narrower than the main oblique groove 4, the axially inner part 10A is provided on the axially outer groove wall 21 with the above-mentioned chamfer portion 21B backed by the recess 23 to prevent demolding defects.

Figure 7:
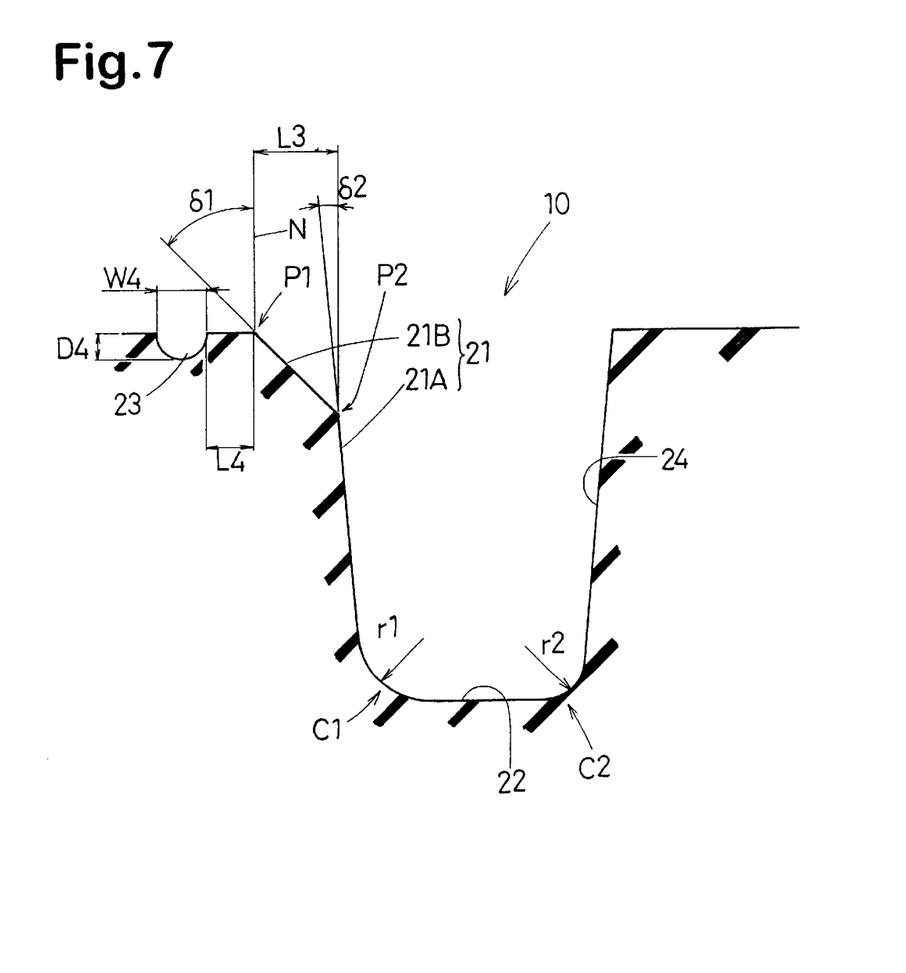
FIG. 7 is an enlarged cross sectional view of a secondary oblique groove.

FIG. 7 shows a cross section of this inner part 10A at a right angle to the groove center line. The axially outer groove wall 21 is constructed to have a main portion 21A extending radially outwards from the groove bottom 22 and a chamfer portion 21B extending from the main portion 21A to the tread face 2. The inclination angle 61 of the chamfer portion 21B is set in a range of from 30 to 60 degrees. The inclination angle 62 of the main portion 21A is preferably set in a range of from 2 to 8 degrees. The corner C1 between the outer groove wall 21 and groove bottom 22 is rounded by a radius of curvature (r1) of from 0.5 to 2.0 mm. The width L3 of the chamfer portion 21B is set in a range of from 0.3 to 2.0 mm. Along the outer edge P1 of the chamfer portion 21B, there is formed a recess 23 having a width W4 of from 0.3 to 3.0 mm and a depth D4 of from 0.3 to 2.0 mm. The distance L4 of the recess 23 from the edge P1 is in a range of from 0.5 to 2.0 mm. On the other hand, the axially inner groove wall 24 is not provided with the chamfer portion, and thus it is composed of only the main portion inclined at an angle δ2 of from 2 to 8 degrees. The corner C2 between the inner groove wall 24 and the groove bottom 22 is rounded by a radius of curvature (r2) less than the radius (r1).

In this embodiment, the above-mentioned shoulder portions 2S are provided with wide oblique grooves 26 and narrow oblique grooves 27 which are arranged alternately in the tire circumferential direction. The wide oblique grooves 26 extend from the outer circumferential groove 3 to the tread edge Te while gradually increasing the groove width. The narrow oblique grooves 27 extend from the outer circumferential groove 3 to the tread edge Te while gradually decreasing the groove width. The wide oblique grooves 26 are aligned with the respective main oblique grooves 4, and the narrow oblique grooves 27 are aligned with the respective secondary oblique grooves 10. In the shoulder portions 2S, the demolding-defect preventing means are not provided.

In the present invention, a uni-directional pattern can be employed. For example, the tread pattern shown in FIG. 1 can be modified into such a uni-directional pattern by reversing the inclinations of the tread grooves on one side of the tire equator. In this case, the rotational direction of the tire is such that the oblique grooves 4, 10 enter the ground contacting patch from the axially inner ends. As another modification, the main oblique grooves 4 may be replaced by the secondary oblique grooves 10 or vice versa. As a modification of the mold 30, the split face 31 can be positioned off the tire equator CO. In such a case, if necessary, the positions of the chamfer portions 21B and recess 23 can be changed accordingly.

Comparison Tests

Passenger car tires of size 185/70R14 having the same tread pattern shown in FIG. 1 and same internal structure except for the demolding-defect preventing means were made using single-split molds and tested for demolding defects, tire appearance and the like as follows. Teat results and specifications are shown in Tables 1–9.

1. Demolding Defect and Appearance

The vulcanized tires took out from the mold were checked for demolding defects and the appearance was evaluated.

In the "demolding defects" sections in Tables, "A", "B" and "C" mean "no damage", "scratches were observed" and "abrasion were observed", respectively.

In the "appearance" sections in Tables, "A", "B" and "C" mean "good", "no good" and "poor".

2 Wet performance test (Antiaquaplane test)

A test car provided on all the wheels with test tires was run on a wet asphalt road provided with a 10 mm depth 20 m long water pool along a 100 meter radius circle, and the lateral acceleration (lateral-G) was measured on the front wheels, gradually increasing the turning speed, and the average lateral-G from 50 km/hr to 80 km/hr was obtained. The results are indicated by an index based on Ref.D1 (Table 5) being 100. The larger the index, the higher the resistance to aquaplane.

TABLE 1

| Tire | Ref. A2 | Ex. A1 | Ex. A2 | Ex. A3 | Ex. A4 | Ref. A3 | Ref. A1 |
|---|---|---|---|---|---|---|---|
| Chamfer portion 21B | | | | | | | none |
| Angle δ1 (deg.) | 20 | 30 | 40 | 50 | 60 | 70 | |
| Demolding defects | C | B | A | A | A | A | C |
| Appearance | A | A | A | A | B | C | A |

TABLE 2

| Tire | Ref. B2 | Ex. B1 | Ex. B2 | Ex. B3 | Ex. B4 | Ex. B5 | Ref. B1 |
|---|---|---|---|---|---|---|---|
| Chamfer portion 21B | | | | | | | none |
| Width L3 (mm) | 0.1 | 0.3 | 0.7 | 1.1 | 1.5 | 2 | |
| Demolding defects | C | B | A | A | A | A | C |
| Appearance | A | A | A | A | A | B | A |

TABLE 3

| Tire | Ex. C1 | Ex. C2 | Ex. C3 | Ex. C4 | Ex. C5 | Ex. C6 | Ref. C1 |
|---|---|---|---|---|---|---|---|
| Recess 23 | | | | | | | none |
| Width W4 (mm) | 0.4 | 0.8 | 1.2 | 1.6 | 2 | 2.4 | |
| Depth D4 (mm) | 0.2 | 0.4 | 0.6 | 0.8 | 1 | 1.2 | |
| Demolding defects | B | A | A | A | A | A | B |
| Appearance | A | A | A | A | A | B | A |

TABLE 4

| | Table 1 | Table 2 | Table 3 |
|---|---|---|---|
| Groove wall 21 | | | |
| Main portion 21A | | | |
| Angle δ2 (deg.) | 8 | 8 | 8 |
| Chamfer portion 21B | | | |
| Angle δ1 (deg.) | — | 35 | 30 |
| Width L3 (mm) | 0.5 | — | 0.5 |
| Recess 23 | | | |
| Distance L4 (mm) | 0.5 | 0.5 | 0.5 |
| Width W4 (mm) | 1 | 1 | — |
| Depth D4 (mm) | 0.5 | 0.5 | — |

TABLE 5

| Tire | Ref. D1 | Ref. D2 | Ex. D1 | Ex. D2 | Ex. D3 | Ex. D4 | Ex. D5 | Ref. D3 |
|---|---|---|---|---|---|---|---|---|
| Groove wall 4o | | | | | | | | |
| α max (deg.) | 5 | 10 | 15 | 20 | 25 | 30 | 40 | 50 |
| Demolding defects | C | B | B | A | A | A | A | A |
| Appearance | A | A | A | A | A | A | B | C |
| Wet performance | 100 | 98 | 98 | 98 | 98 | 98 | 95 | 95 |

TABLE 6

| Tire | Ex. E1 | Ex. E2 | Ex. E3 | Ex. E4 | Ex. E5 | Ex. E6 | Ex. E7 |
|---|---|---|---|---|---|---|---|
| Groove wall 4o | | | | | | | |
| Corner radius r (mm) | 0.5 | 1 | 1.5 | 2 | 2.5 | 3 | 3.5 |
| Demolding defects | C | B | A | A | A | A | A |
| Appearance | A | A | A | A | A | B | C |
| Wet performance | 100 | 100 | 99 | 99 | 99 | 97 | 97 |

TABLE 7

| Tire | Ex. F1 | Ex. F2 | Ex. F3 | Ex. F4 | Ex. F5 | Ex. F6 | Ex. F7 |
|---|---|---|---|---|---|---|---|
| Groove wall 4o | | | | | | | |
| Corner radius r (mm) | 0.5 | 1 | 1.5 | 2 | 2.5 | 3 | 3.5 |
| Demolding defects | B | A | A | A | A | A | A |
| Appearance | A | A | A | A | A | B | C |
| Wet performance | 100 | 100 | 99 | 99 | 99 | 97 | 97 |

TABLE 8

| Tire | Ex.G1 | Ex.G2 | Ex.G3 | Ex.G4 | Ex.G5 |
|---|---|---|---|---|---|
| Main oblique groove 4 | | | | | |
| Depth d (mm) | | | | | |
| at J1 | 3.2 | 7.9 | 7.9 | 7.9 | 7.9 |
| in 4B | 3.2 | 3.2 | 7.9 | 6.4 | 4.7 |
| Demolding defects | A | A | C | B | B |
| Appearance | C | A | A | A | A |
| Wet performance | 80 | 100 | 105 | 103 | 101 |

TABLE 9

| | Table 5 | Table 6 | Table 7 | Table 4 |
|---|---|---|---|---|
| Outer circumferential groove 3 | | | | |
| Width W0 (mm) | 5.6 | 5.6 | 5.6 | 5.6 |
| Depth D0 (mm) | 7.9 | 7.9 | 7.9 | 7.9 |
| Main oblique groove 4 | | | | |
| Inclination θ1 (deg.) | | | | |
| at J1 | 45 | 45 | 45 | 45 |
| Groove walls' inclination | | | | |
| αmax (deg.) | — | 15 | 20 | 20 |
| β (deg.) | 3 | 3 | 3 | 3 |
| Top width W (mm) | | | | |
| at J1 | 3.1 | 3.1 | 3.1 | 3.1 |
| at K | 5.2 | 5.2 | 5.2 | 5.2 |
| Depth d (mm) | | | | |
| at J1 | 7.9 | 7.9 | 7.9 | — |
| in 4B | 3.2 | 3.2 | 3.2 | — |
| Corner radius r (mm) | 1 | — | — | 1 |

What is claimed is:

1. A tire comprising
a tread portion in which a mold parting line by a single-split mold runs on or near the tire equator defining a right-hand part of the tread portion on one side of the mold parting line and a left-hand part on the other side, the tread portion provided in at least a central part with tread grooves each having a right-hand groove wall and a left-hand groove wall, wherein in the right-hand part, the right-hand groove walls are at least partially provided with an inclined part extending from the tread face towards the groove bottom while inclining to the left, and the left-hand groove walls are inclined less than the inclined part of the respective opposite right-hand groove walls, in the left-hand part, the left-hand groove walls are at least partially provided with an inclined part extending from the tread face towards the groove bottom while inclining to the right, and the right-hand groove walls are inclined less than the inclined part of the respective opposite left-hand groove walls, the inclined parts are
a first inclined part extending from the tread face to the vicinity of the groove bottom, inclining at a first inclination angle of from 15 to 45 degrees with respect to the normal direction to the tread face, and
a second inclined part inclined at a second inclination angle of from 30 to 60 degrees with respect to the normal direction to the tread face and having a width of from 0.3 to 2 mm when measured in parallel to the tread face and accompanied by a recess which is narrower and shallower than the tread groove and extends along the second inclined part wherein
the recess has a width of from 0.3 to 3 mm and a depth of from 0.3 to 2.0 mm, and the distance of the recess from the second inclined part is in a range of from 0.5 to 2.00 mm.

2. The tire according to claim 1, wherein
the tread grooves include a circumferential groove provided with the second inclined part accompanied by the recess.

3. The tire according to claim 2, wherein
the circumferential groove is disposed on the mold parting line and both the groove walls thereof are provided with the second inclined part accompanied with a recess, whereby the recess is formed on each side of the circumferential groove.

4. The tire according to claim 1, wherein
the tread grooves include oblique grooves provided with the first inclined part.

5. The tire according to claim 4, wherein
each of the oblique grooves extends axially inwardly from an axially outer circumferential groove, the axially outer circumferential groove is disposed on each side of the tire equator.

6. The tire according to claim 1, wherein
the tread grooves include wide oblique grooves provided with the first inclined part, and narrow oblique grooves provided with the second inclined part accompanied by the recess.

7. The tire according to claim 6, wherein
each of the oblique grooves extends axially inwardly from an axially outer circumferential groove, the axially outer circumferential groove is disposed on each side of the tire equator.

8. The tire according to claim 1, wherein
the corner between the groove wall provided with the inclined part and the groove bottom is rounded.

9. A tire comprising
a tread portion in which a mold parting line by a single-split mold runs on or near the tire equator defining a right-hand part of the tread portion on one side of the mold parting line and a left-hand part on the other side,
the tread portion provided in at least a central part with tread grooves each having a right-hand groove wall and a left-hand groove wall, wherein
in the right-hand part,
the right-hand groove walls are at least partially provided with an inclined part extending from the tread face towards the groove bottom while inclining to the left,
and the left-hand groove walls are inclined less than the inclined part of the respective opposite right-hand groove walls,
in the left-hand part,
the left-hand groove walls are at least partially provided with an inclined part extending from the tread face towards the groove bottom while inclining to the right,
and the right-hand groove walls are inclined less than the inclined part of the respective opposite left-hand groove walls, the inclined parts are
a first inclined part extending from the tread face to the vicinity of the groove bottom, inclining at a first inclination angle of from 15 to 45 degrees with respect to the normal direction to the tread face, and/or
a second inclined part inclined at a second inclination angle of from 30 to 60 degrees with respect to the normal direction to the tread face and having a width of from 0.3 to 2 mm when measured in parallel to the tread face and accompanied by a recess which is narrower and shallower than the tread groove and extends along the second inclined part, and the tread grooves include a circumferential groove provided with the second inclined part accompanied by a recess, wide oblique grooves provided with the first inclined part, and narrow oblique grooves provided with the second inclined part accompanied by a recess.

10. The tire according to claim 9, wherein
each of the wide oblique grooves comprises an axially inner circumferential portion and an axially outer inclined portion which merges into the axially inner circumferential portion,
an inclination angle of the axially outer inclined portion with respect to the tire circumferential direction gradually decreases from an angle at the axially outer end thereof which is in a range of from 30 to 60 degrees to substantially zero degrees at a connecting point with the circumferential portion, and
the first inclination angle of the first inclined part has a maximum in the vicinity of the connecting point and gradually decreases towards both side thereof, whereby the groove width at the groove top becomes wider in the vicinity of the connecting point.

11. The tire according to claim 10, wherein
the groove width at the groove bottom is increased in the vicinity of the connecting point.

12. The tire according to claim 10, wherein
the depth of each of the wide oblique grooves gradually decreases from the axially outer end to the axially inner end thereof.

13. The tire according to claim 10, wherein
the circumferentially adjacent circumferential portions are connected with each other by circumferentially extending narrow connecting grooves having a width of from 0.5 to 3 mm and a depth of from 2 to 5 mm.

14. The tire according to claim 9, wherein each of the oblique grooves extends axially inwardly from an axially outer circumferential groove, the axially outer circumferential groove is disposed on each side of the tire equator and not provided with the inclined part.

* * * * *